(12) United States Patent
Ronchi (10) Patent No.: US 9,815,207 B2
(45) Date of Patent: Nov. 14, 2017

(54) SUPPORTING AND GRIPPING DEVICE IN PARTICULAR FOR CONTAINER FILLING AND/OR CAPPING LINES

(71) Applicant: RONCHI MARIO S.p.A., Gessate (MI) (IT)

(72) Inventor: Cesare Ronchi, Gessate (IT)

(73) Assignee: RONCHI MARIO S.P.A., Gessate (MI) (IT)

( * ) Notice: Subject to any disclaimer, the term of this patent is extended or adjusted under 35 U.S.C. 154(b) by 0 days.

(21) Appl. No.: 15/197,125

(22) Filed: Jun. 29, 2016

(65) Prior Publication Data
US 2017/0001313 A1 Jan. 5, 2017

(30) Foreign Application Priority Data

Jul. 1, 2015 (IT) .......................... 102015000029692

(51) Int. Cl.
*B25J 15/02* (2006.01)
*B25J 15/10* (2006.01)
(Continued)

(52) U.S. Cl.
CPC ............. *B25J 15/026* (2013.01); *B23B 31/18* (2013.01); *B25J 15/0028* (2013.01);
(Continued)

(58) Field of Classification Search
CPC ................ B25J 15/0028; B25J 15/0213; B25J 15/0226; B25J 15/0233; B25J 15/024; B25J 15/026; B25J 15/028; B25J 15/0286; B25J 15/0293; B25J 15/103; B25J 15/106; B25J 15/10; Y10S 901/37; Y10S 901/38; Y10S 901/39; B23B 31/18; B67B 3/206; B67C 3/24
(Continued)

(56) References Cited

U.S. PATENT DOCUMENTS 5,024,478 A * 6/1991 Toriyama ............... B65G 47/90
294/119.1
5,383,697 A * 1/1995 Roudaut .................. B25J 9/144
294/115

(Continued)

FOREIGN PATENT DOCUMENTS

GB 2 316 894 A 3/1998
JP H09 267287 A 10/1997

OTHER PUBLICATIONS

Search Report for Italian Patent Application No. ITUB20151858, dated Feb. 24, 2016.

*Primary Examiner* — Dean Kramer
(74) *Attorney, Agent, or Firm* — Dowell & Dowell, P.C.

(57) ABSTRACT

Device for supporting and gripping containers (1,1a), comprising:
a base (10;110;210) which defines an upper surface (15;115, 215) supporting a container (1;1a);
devices (20;120) for gripping the container (1,1a), associated with the base (10;110;210);
devices (30) for actuating the devices (30) for gripping the container (1,1a); wherein the gripping devices (20;120) comprise at least one pair of sliders (21;121;221) inserted in the base (10;110;210) inside a respective seat (16;116;216) and translationally movable in both senses of different directions upon operation of the actuating devices (30), each jaw being associated with a respective slider (21;121;221).

19 Claims, 8 Drawing Sheets

(51) Int. Cl.
*B23B 31/18* (2006.01)
*B67B 3/20* (2006.01)
*B67C 3/24* (2006.01)
*B25J 15/00* (2006.01)

(52) U.S. Cl.
CPC ............. *B25J 15/028* (2013.01); *B25J 15/10* (2013.01); *B67B 3/206* (2013.01); *B67C 3/24* (2013.01)

(58) Field of Classification Search
USPC .............................................. 294/115, 119.1
See application file for complete search history.

(56) References Cited

U.S. PATENT DOCUMENTS

| | | | | |
|---|---|---|---|---|
| 5,693,113 A | * | 12/1997 | Dries | ...................... C03B 35/04 |
| | | | | 294/115 |
| 5,904,358 A | * | 5/1999 | Hosono | ................... B25B 5/087 |
| | | | | 269/126 |
| 6,530,615 B2 | * | 3/2003 | Filipiak | ................... B25B 5/087 |
| | | | | 294/116 |
| 2005/0046212 A1 | | 3/2005 | Maffeis | |
| 2008/0023925 A1 | | 1/2008 | Tomita et al. | |

\* cited by examiner

SUPPORTING AND GRIPPING DEVICE IN PARTICULAR FOR CONTAINER FILLING AND/OR CAPPING LINES

CROSS REFERENCE TO RELATED APPLICATION

This application claims the benefit of Italian Patent Application No. 102015000029692, filed Jul. 1, 2015, which is hereby incorporated by reference in its entirety.

BACKGROUND OF THE INVENTION

The present invention relates to a device for supporting and gripping containers, in particular for container filling and/or capping lines.

It is known, in the technical sector for packaging containers by means of automatic lines comprising, among other things, at least one filling machine and at least one apparatus for fitting the container closing cap, that the containers must be conveyed underneath corresponding nozzles for dispensing the product to be packaged and then to the capping station using programmed and synchronized sequences.

Also known are numerous container supporting and gripping devices, substantially based on the use of worm screws and rotating star-wheels which, although generally fulfilling their function and being widely used for this purpose, are nevertheless unsuitable for handling containers with a heightwise dimension—i.e. dimension perpendicular to the plane of travel of the container—which is small; in this case, in fact, it is not possible to stably retain the container during screwing of the associated cap, during which step the container rotates together with the cap, preventing correct screwing of the latter onto the former.

A similar problem is also posed for those containers which, although of sufficient height, nevertheless have a thickness and strength suitable for stable gripping only in their bottom base part.

Examples of devices according to the prior art are known from GB 2,316,894 and US 2005/046212 A1. In the field of box-making machines, U.S. Pat. No. 5,024,478 discloses a box blank holding device for a box-making machine having a main body, a driving rack and a motor mechanism for reciprocally moving the driving rack relative to the main body. A transmission shaft is rotatably supported on the main body, the transmission shaft having a pair of pinions, and one of the pinions being in meshing engagement with the driving rack. A pair of holding-member actuating racks are disposed in meshing engagement with the other pinion. Each of the holding-member actuating racks has a holding member pivotally mounted thereto on an end thereof. Each of the holding members also has a roller thereon. The rollers are guided in respective guide grooves provided on the main body for guiding the holding members between projecting and retracted positions for holding and releasing a stack of box blanks.

SUMMARY OF THE INVENTION

The technical problem which is posed, therefore, is that of providing a device for supporting and gripping containers which have small dimensions, in particular heightwise and/or with parts designed to allow stable gripping only along sections situated at a small distance from the support surface, which is able to keep the container stably fixed along the whole of its travel path along the line and in particular also during screwing of the associated cap once filling has been performed.

In connection with this problem it is also required that this device should have small dimensions, be easy and inexpensive to produce and assemble and be able to be easily installed also on existing machines using normal standardized connection means.

These results are obtained according to the present invention by a device for supporting and gripping containers, in particular for container filling and/or capping lines, according to the features of Claim 1.

BRIEF DESCRIPTION OF THE DRAWINGS

Further details may be obtained from the following description of non-limiting examples of embodiment of the subject of the present invention, provided with reference to the accompanying drawings, in which.

DETAILED DESCRIPTION OF THE INVENTION

Figure 1:
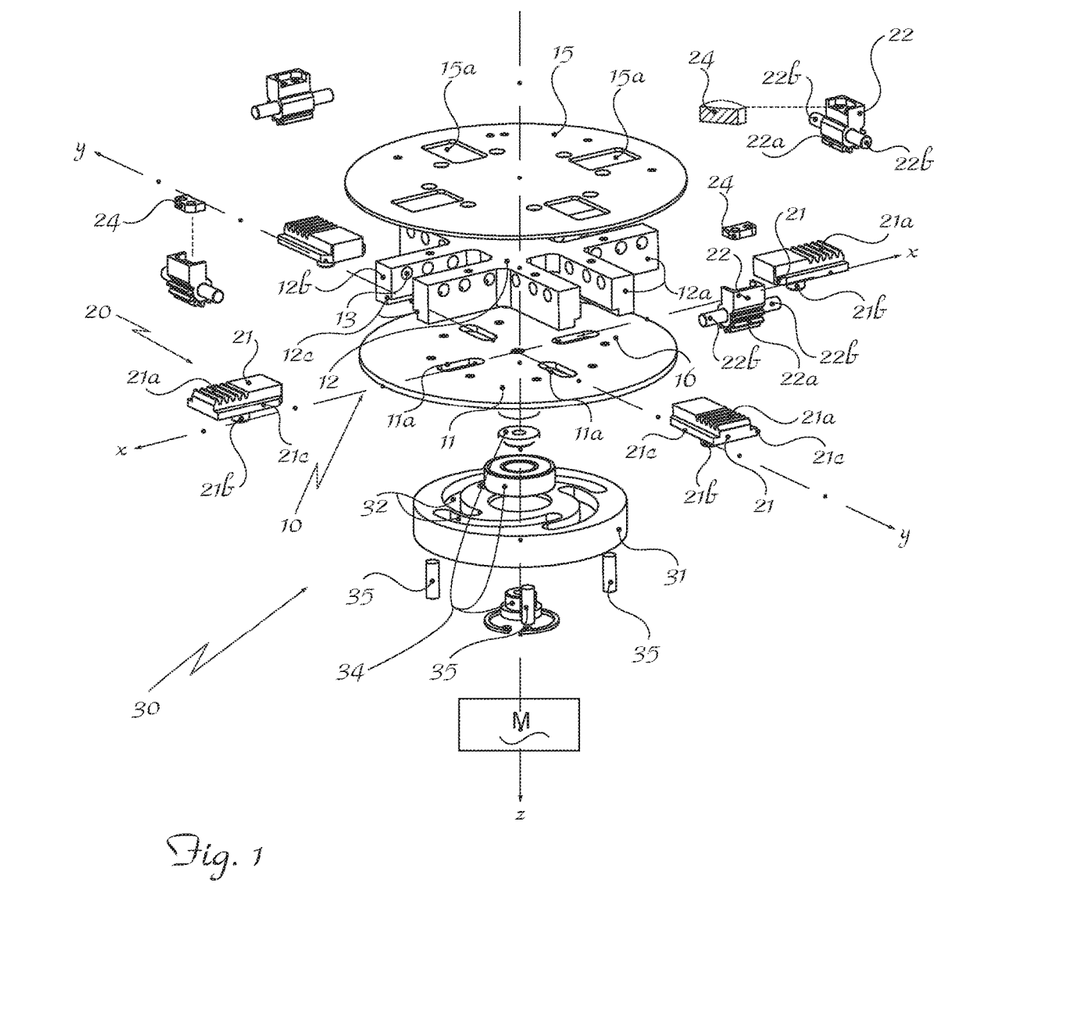
FIG. 1: shows an exploded view of a first embodiment of the supporting and gripping device according to the present invention.

As shown in FIG. 1 and in connection with the examples of embodiment of a supporting and gripping device according to the invention the following is assumed solely for the sake of easier description and without a limiting meaning: a set of three reference axes, i.e. in a longitudinal-diametral direction X-X and transverse-diametral direction Y-Y of a container 1, perpendicular to each other; and in a vertical direction Z-Z, perpendicular to the other two directions and for the sake of convenience indicated as coinciding with the vertical axis of the device and parallel to the heightwise direction of the said container 1, as well as a top part close to the container and bottom part opposite to the top part.

Assuming the agreed meanings indicated above, the supporting and gripping device according to the invention comprises:
a base 10,
devices 20 for gripping the bottle 1, associated with the said base 10,
devices 30 for actuating the devices 20 for gripping the bottle 1.

In greater detail, in a first embodiment shown in FIG. 1, the base 10 comprises:
a bottom surface 11 provided with slots 11a—four in number arranged at an angular distance of 90° in the example shown—and a central through-hole 11b;
a cross-shaped frame 12, the arms 12a of which are in the form of a U; a hollow receiving seat 16 is formed between the branches 12b of each U; holes 13, arranged opposite each other, with their axis parallel to the bottom surface 11, are formed in the branches 12b of the U; in their part adjacent to the bottom surface 11 the branches 12b of the U have guides 12c extending parallel to the respective arm for sliding of shoes 21c of elements 21 of the devices 20 for gripping the container 1, as will emerge more clearly below;
an upper surface 15 provided with openings 15a respectively aligned with the corresponding internal cavity formed by the branches 12b of the arms 12a of the underlying cross 12;
the three elements 11,12,15 forming the base 10 are rigidly connected together in the vertical direction by means of pins inserted in corresponding holes or similar connection means conventional per se and not described in detail;
each of the gripping devices 20 comprises in turn:
a slider 21 provided with:
a rack 21a formed on its top side parallel to the bottom surface 11;
a vertical pin 21b extending outwards from the bottom surface and suitable for insertion inside the respective slot 11a of the bottom surface 11; the bottom vertical pin 21b has a length such as to pass through the slot 11a over a suitable vertical distance;
shoes 21c which extend along the edges of the bottom surface of the slider parallel to the branches of the respective U-shaped arm of the cross piece 12 and by means of which the slider may slide on the said guides 12c of the branches of the cross piece 12;
a jaw 22 provided with:
a toothing 22a designed to mesh with the rack 21a;
a pin 22b integral with the body 22 and extending through the said body 22 perpendicular to the branches of the U-shaped arm of the cross piece and to the vertical direction Z-Z; the pin 22b projects from the two opposite side faces of the body 22 and is designed to be inserted inside the said horizontal-axis holes 13 of the arms 12b of the cross piece;
preferably an element 24 made of high-friction material, such as rubber or the like, designed to be fitted onto/inserted into the jaw 22 and engage in the side surface 1a of the container 1 during gripping thereof.
the devices 30 for actuating the gripping devices 20 comprise:

a flat element 31 having, formed therein, a number of hollow cams 32 corresponding to the number of sliders 21—four in number in the example shown inside which cams the respective bottom vertical pin 21b of the said slider 21 is inserted;
devices denoted overall by 34 designed to connect the actuating devices to the base 10 through the central hole 11b of the bottom surface 11;
vertical pins 35 extending vertically outwards and forming movement receiving devices to be coupled with a device M for generating a rotational movement in both the senses—clockwise and anti-clockwise—of the said flat element 31.

Figure 2:
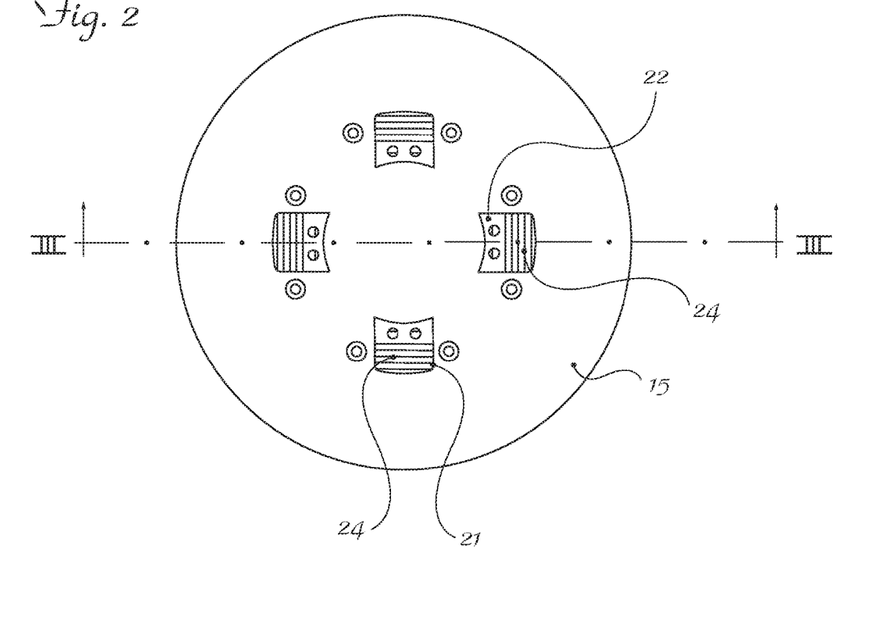
FIG. 2: shows a top plan view of the device according to FIG. 1 assembled in the rest condition.
Figure 3:
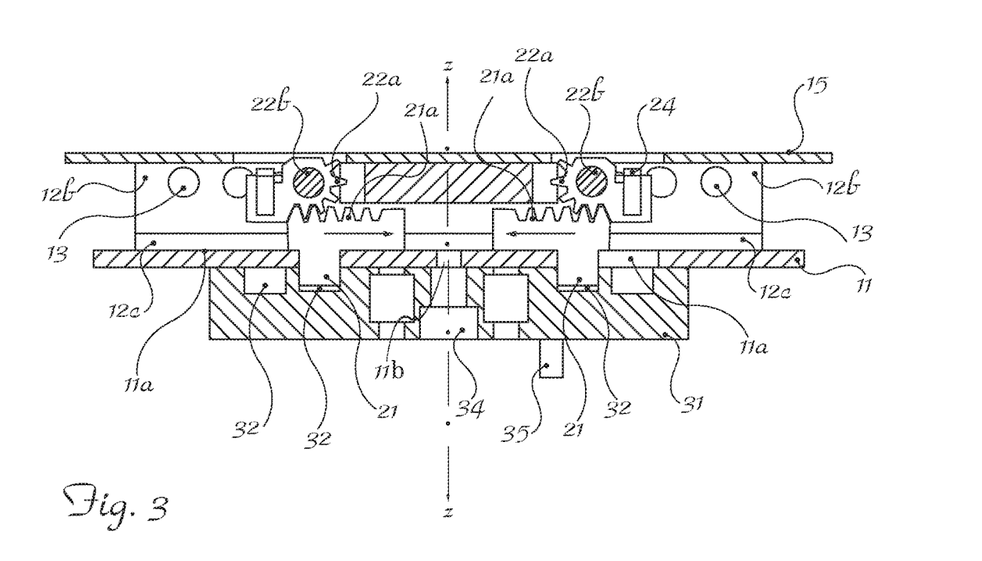
FIG. 3: shows a schematic cross-section along the plane indicated by III-III in FIG. 2.

With this configuration, operation of the supporting and gripping device according to the invention is as follows:
in the rest condition (FIGS. 2 and 3):
the bottom vertical pins 21b of the sliders 21 are arranged at one end of the respective cam 32 of the flat element 31, correspondingly the sliders 21 are pushed radially towards the vertical central axis Z-Z of the device;
during displacement towards this position each rack 21a acts on the respective engaging element 22a of the corresponding jaw 22 so as to rotate the latter, by means of the respective pin 22b, and cause it to retract through the respective opening 15a inside the hollow seat in the arms 12b of the U of the cross piece 12, thus defining a flat upper base on which a bottle may be easily rested and/or made to slide without interference.

Figure 4:
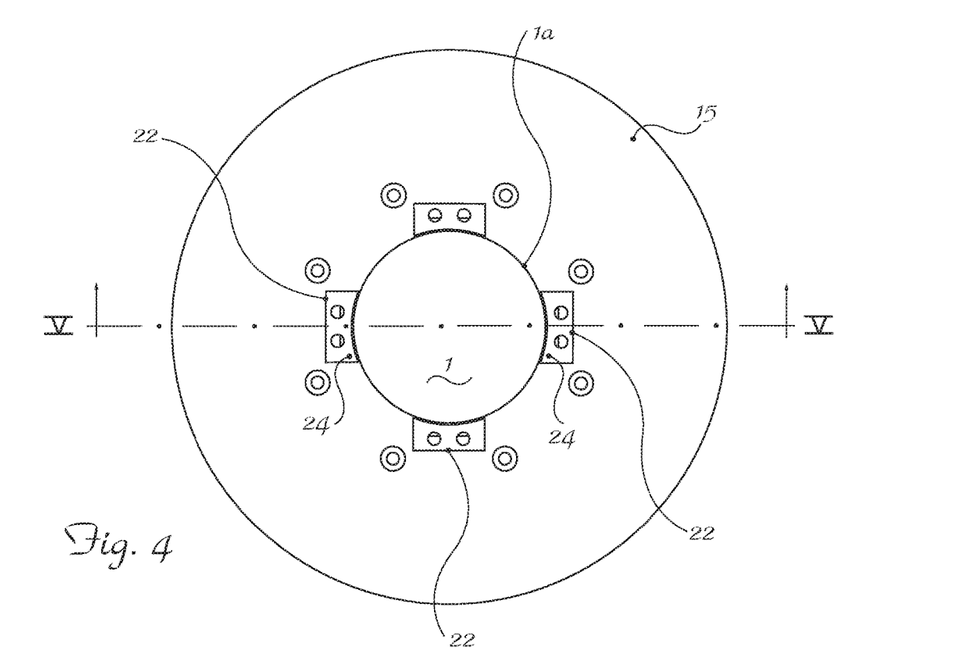
FIG. 4: shows a top plan view, similar to that of FIG. 2, with the bottle in position and device in a configuration for gripping thereof.
Figure 5:
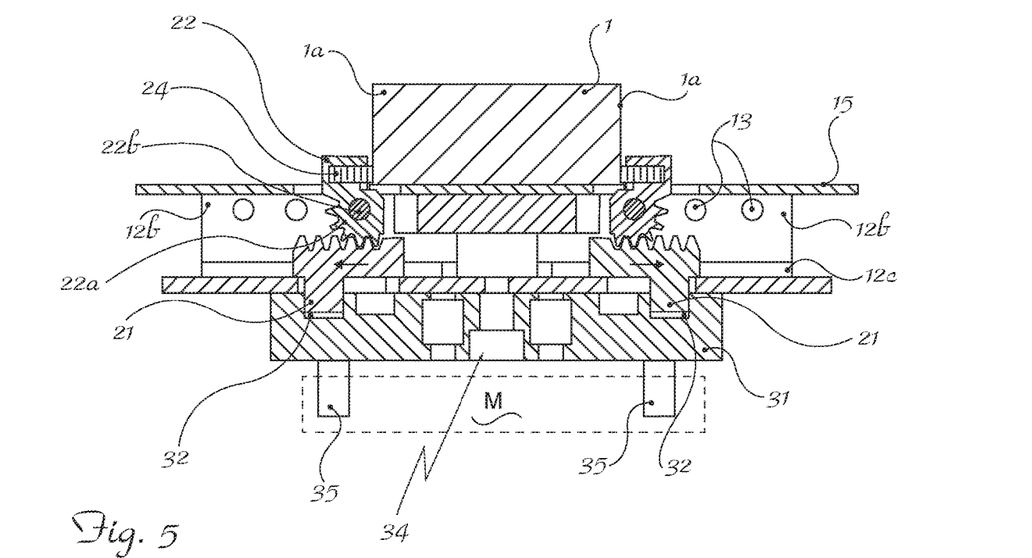
FIG. 5: shows a schematic cross-section along the plane indicated by V-V in FIG. 4.

Once the bottle 1 has been positioned (FIGS. 4,5) on the upper surface 15, the movement generating device M is operated so as to cause rotation, via the pins 35, of the flat element 31 which, via the cams 32, moves the bottom vertical pins 21b of the sliders 21 and therefore the sliders themselves in the respective longitudinal/transverse diametral direction away from the vertical central axis Z-Z;
during displacement, the rack 21a of the slider 21 acts on the toothing 22a which, causing the respective jaw 22 to rotate on the pin 22b, moves said jaw outside of the opening 15a until it makes contact, via the friction element 24, if present, with the side surface 1a of the container 1, ensuring stable gripping and retention thereof.

Figure 6:
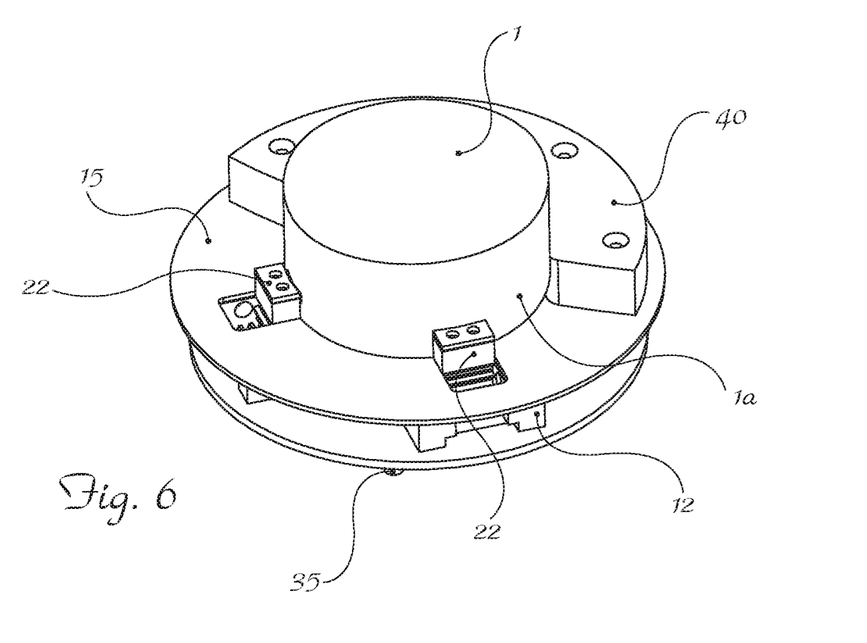
FIG. 6: shows a perspective view of a variant of the first embodiment of the device according to the invention.

As shown in FIG. 6, it is also envisaged that the upper surface 15 may be provided with a circle segment 40 which has a predetermined angular extension and internally is at least partially hollow, being designed to form an end-of-travel stop for the bottle 1 and ensure rapid and precise positioning on the device before gripping by means of the jaws 22.

Figure 7:
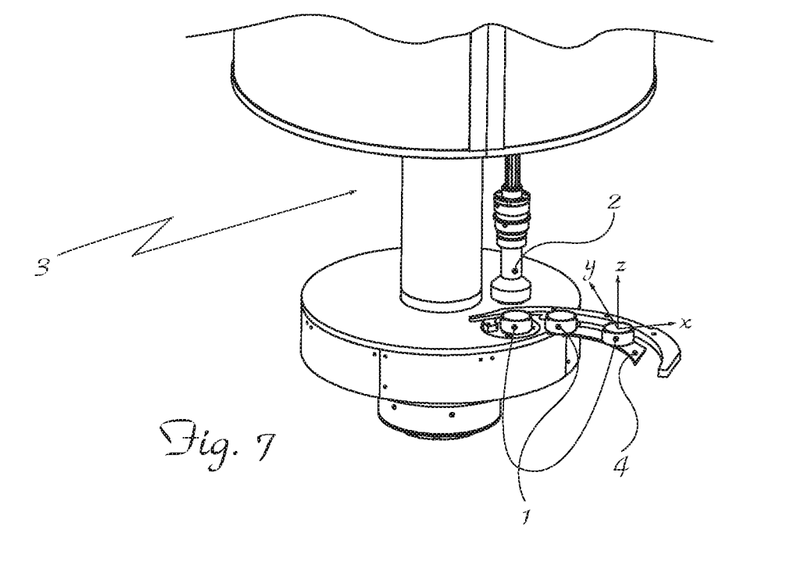
FIG. 7: shows a perspective view of the device according to the invention with bottle during arrival in a cap screwing station.

FIG. 7 shows the supporting and gripping device which retains the bottle 1 during its movement up to the cap screwing spindle 2 in a cap fitting station generally indicated by 3 in an operating machine along the filling line.

Figure 8:
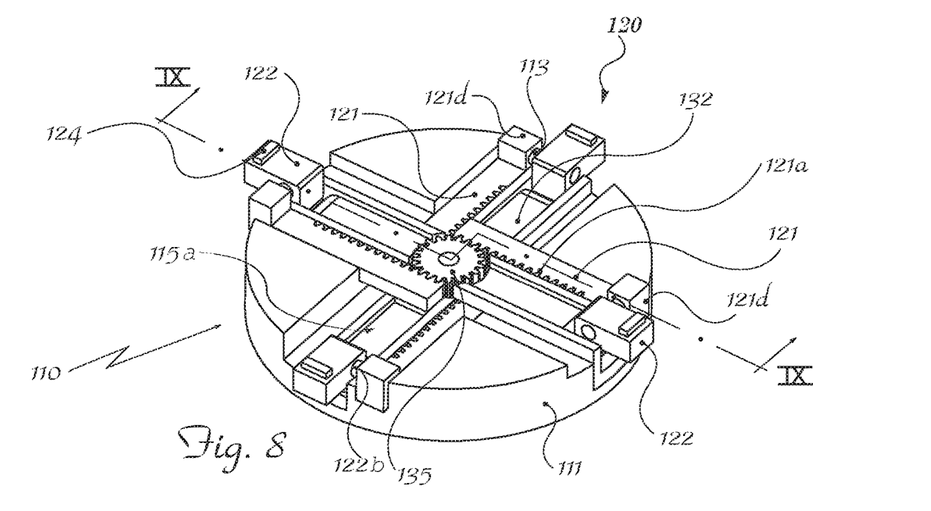
FIG. 8: shows a partial perspective view of a second embodiment of the supporting and gripping device according to the present invention.
Figure 9:
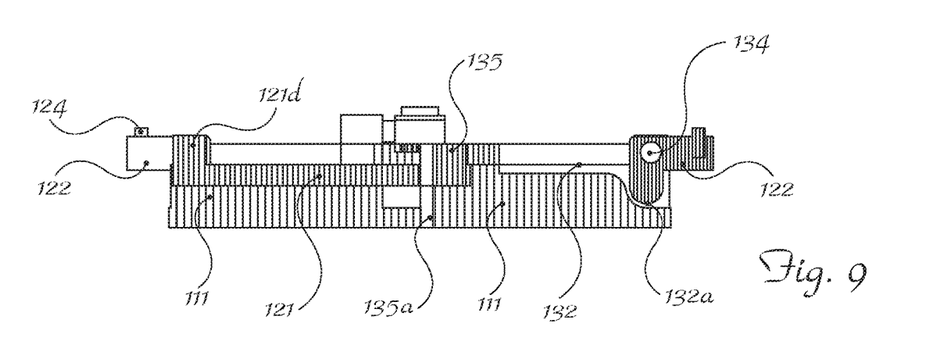
FIG. 9: shows a schematic cross-section along the plane indicated by IX-IX in FIG. 8.

FIG. 8 shows a second embodiment of the device according to the invention which comprises substantially:
a base 110 which incorporates in a single body a frame 112 comprising:
at least two inset seats 116—four in the example shown which extend parallel to a longitudinal-diametral direction X-X or transverse-diametral direction Y-Y; the said seats 116 shown are parallel to each other in pairs and arranged in pairs on different levels in the vertical direction Z-Z and preferably symmetrical with respect to the latter when passing through the centre of the base;
a cavity 132 adjacent and parallel to each inset seat 116;
an inclined surface 132a (FIG. 10b,11b) formed in the thickness of the base 110 at the end of the cavity 132 which is distal relative to the central vertical axis Z-Z; the inclined surface extends between a lower level substantially corresponding to the bottom of the cavity 132 and an upper level corresponding to the upper surface of the base 110; the inclined surface is preferably shaped in the manner of a rounded connecting surface;

gripping devices 120 comprising:

a slider 121 housed inside each inset seat 116 and comprising a linear rack 121a formed on the inner side thereof at right angles to the plane of the base 110, and an end head 121d which is distal relative to the axis Z-Z and has a hole 113 with an axis parallel to the base plane and at right angles to the slider head;

a jaw 122 provided with a pin 122b projecting parallel to the base plane from one side of the jaw and with a diameter suitable for insertion inside the hole 113 in the head 121d of the slider 121; with the pin inserted inside the respective hole and slider arranged in the distal end position of its seat 116, the jaw is arranged, pivoted downwards, below the upper surface 115 alongside the head 121d of the slider 121;

actuating devices comprising:

at least one toothed wheel 135 rotating about a vertical axis coinciding with the vertical axis Z-Z passing through the centre of the base 110 and designed to mesh with the rack 121a of at least two sliders 121; in the case of two pairs of sliders 121 arranged on different vertical levels, the toothed wheel will have a height such as to mesh with all the sliders at the same time; the toothed wheel has a shaft 135a for receiving the movement from devices M for generating the rotational movement (not shown);

an upper closing surface 115, provided with openings 115a each of which is aligned with and parallel to a respective underlying seat 132 for sliding of the jaw 122, provided with an inclined surface 132a.

Figure 10A:
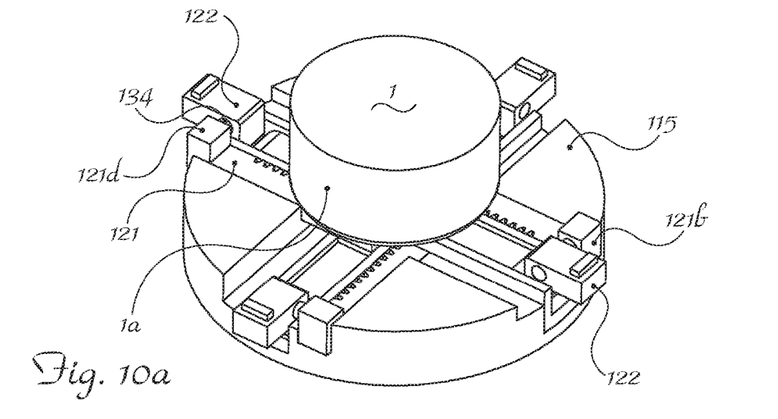
FIG. 10a: show a perspective view of the device according to FIG. 8 during positioning of a bottle with a given diameter.
Figure 10B:
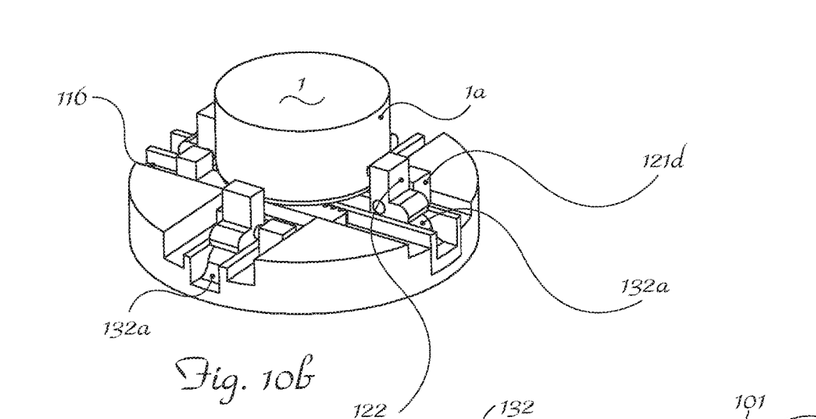
FIG. 10b: show a perspective view of the device according to FIG. 8 during gripping of a bottle with a given diameter.
Figure 11:
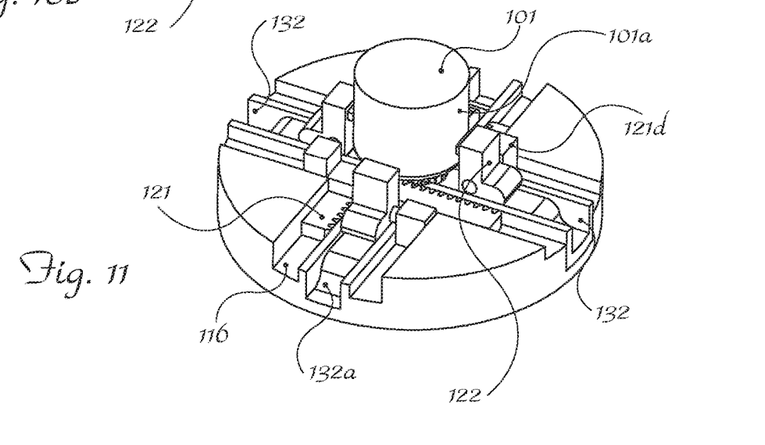
FIG. 11: shows a perspective view of the device according to FIG. 8 during gripping of a bottle with a different diameter.

With this embodiment the operating principle of the device is as follows:

in the rest position, the sliders 121 are pushed by the toothed wheel 135 acting on the rack 121a towards the outer distal end of the respective seat 113, in this position, the jaws 122 move down the inclined surface 132a, pivoting parallel to the plane of the base through the respective opening 115a and inside their respective seat 132;

once the container 1 has been positioned on the base 110, the toothed wheel 135 is actuated and, rotating, interacts with the racks 121a of the sliders 121 which start to move towards the central axis Z-Z inside their seats 116;

the displacement of the sliders 121 causes the respective jaw 122 to move back up the inclined surface 132a, with consequent rotation of the jaw which is arranged at right angles to the surface 115 of the base 110 and outside of it;

continuing their travel determined by the toothed wheel, the sliders 121 (FIG. 10b);

bring the respective jaw into contact with the side surface 1a of the container 1, causing automatic self-centring of the latter relative to the vertical axis Z-Z and the subsequent gripping and retention of the container for movement thereof within the packaging line.

It can be seen in this embodiment how the device is designed to automatically grip and retain containers with different diametral dimensions (FIGS. 10b,11) without the need for format-changing operations which result in long machine downtimes.

Figures 12A, 12B, 13:
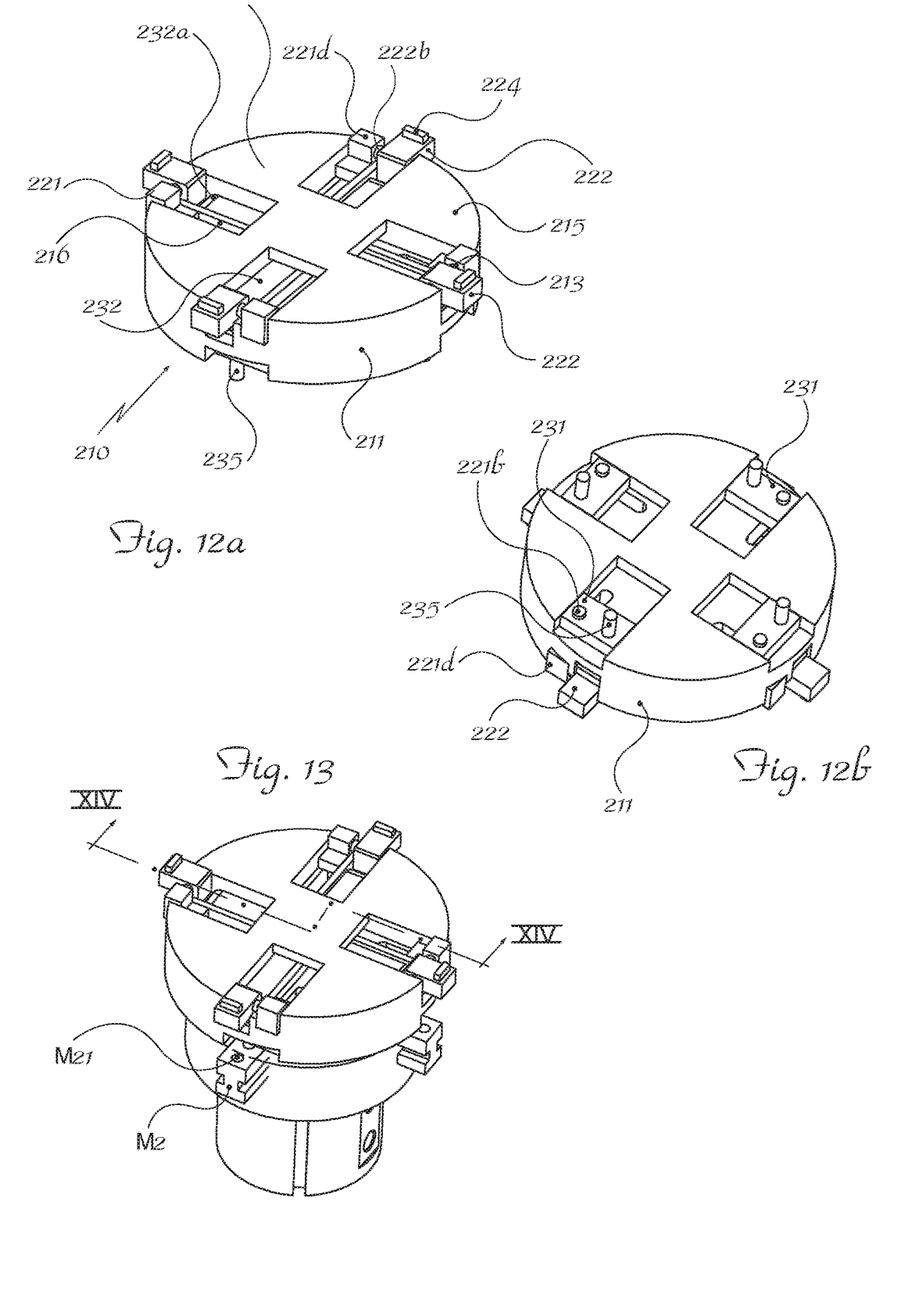
FIG. 12a: show a perspective view from above of a variant of the device according to FIG. 8.
FIG. 12b: show a perspective view from below of a variant of the device according to FIG. 8.
FIG. 13: shows a perspective view of the device according to FIG. 12 assembled with the actuating devices.
Figure 14:
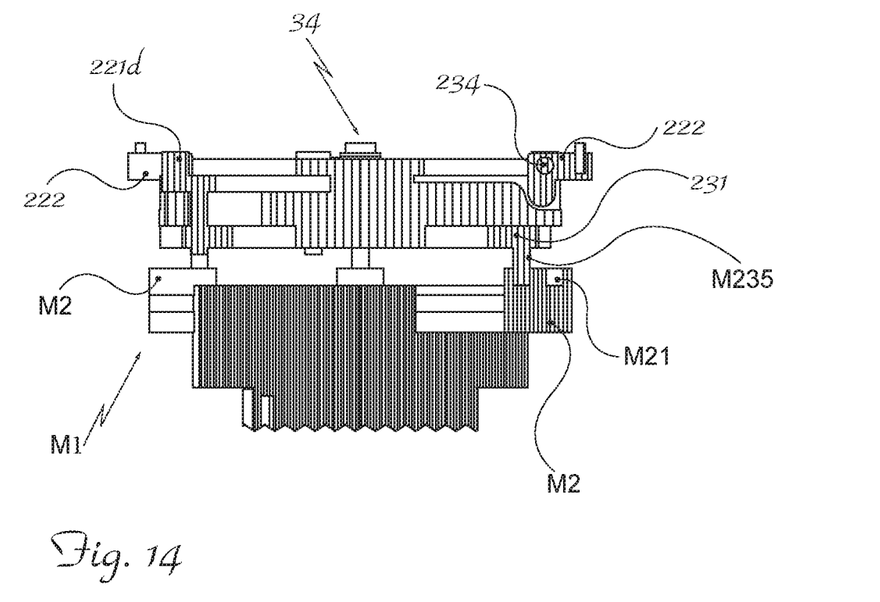
FIG. 14: shows a cross-section along the plane indicated by XIV-XIV in FIG. 13.

FIG. 12 shows a variation of embodiment of the device according to the invention, similar to that of FIG. 8, in which the reference numbers of the parts which remain unchanged and/or are equivalent are maintained; in this version the device comprises substantially:

a base 210 which incorporates in a single body a frame 212 comprising:

at least two inset seats 216 extending in directions parallel to the longitudinal-diametral direction X-X and/or transverse-diametral direction Y-Y; in the example shown the inset seats 216 are conventionally four in number; said seats 216 are arranged at a suitable relative angular distance (90° in the example illustrated with four seats);

a cavity 232 adjacent and parallel to each inset seat 216;

an inclined surface 232a formed in the thickness of the base 210 at the end of the cavity 232 which is distal relative to the central vertical axis Z-Z; the inclined surface 232a extends between a lower level substantially corresponding to the bottom of the cavity 232 and an upper level substantially corresponding to the upper surface 215 of the base 210; the inclined surface is preferably shaped in the manner of a rounded connecting surface.

gripping devices comprising:

a slider 221 housed inside each seat 216 and comprising an end head 221d which is distal relative to the axis Z-Z and provided with a first hole 213 having an axis parallel to the base plane and open in its side surface and with a pin 221b having a vertical axis projecting from the bottom surface of the said head (FIG. 14);

a jaw 222 provided with a pin 222b projecting from one side of the jaw, at right angles thereto and parallel to the plane of the base 210, and with a diameter suitable for insertion inside the first hole 213 in the head 221b of the slider 221; with the pin inserted inside the respective hole and slider arranged in the distal end position of its seat 116, the jaw is arranged, pivoted downwards, alongside the head 221b of the slider 112;

actuating devices comprising for each slider 221:

a flat element connected at the top to the pin 221b of the slider 221 and provided with a pin 235 projecting from the bottom surface and suitable for coupling with movement generation devices M which, according to preferred embodiments, may comprise a pneumatic actuating system M1 provided with a head M2 having vertical holes M21 designed to engage with the said pin 235 on the head 221b of the slider.

Although described purely by way of example in connection with cylindrical forms where the longitudinal and transverse directions correspond conveniently to diametral or chord directions both of the device and of the bottles, both the device and the bottles may have any suitable polygonal form; thus for cylindrical bottles only three gripping devices suitably arranged at a regular angular distance may be sufficient, while in the case of polygonal bottles only two gripping devices could also be sufficient, being suitably arranged on only two sides of the container so as to ensure in any case retention of the bottle during screwing of the cap.

In this latter case, both the sliders with the respective seats and the jaws will be arranged in the most appropriate directions angularly inclined with respect to the longitudinal-diametral and/or transverse-diametral directions.

It is therefore clear how with the device according to the invention it is possible to ensure firm gripping and stable retention of bottles during their transportation within the packaging line, also in the case of bottles with a small vertical dimension.

The device is also suitable for those bottles, for example bottles similar to bottles of water, which, while having a sufficient vertical dimension, are made with small-thickness material and therefore have zones which are able to adequately withstand gripping only in their bottom part resting on the transportation surfaces, handling thereof using conventional machines therefore being particularly difficult.

Although described in connection with a number of embodiments and a number of preferred examples of embodiment of the invention, it is understood that the scope of protection of the present patent is determined solely by the claims below.

The invention claimed is:

1. Device for supporting and gripping containers (1,1a), comprising:
    a base (10;110;210) defining an upper surface (15;115; 215) for supporting a container (1,1a);
    devices (20;120) for gripping the container (1,1a), associated with the said base (10;110;210);
    devices (30) for actuating the devices (20;120) for gripping the container (1,1a), wherein said gripping devices (20;120) comprise at least one pair of jaws (22;122; 222), each rotating between a position, pivoted downwards, substantially contained below the upper surface (15;115;215) of the base (10;110;210), and a raised position for gripping the container (1,1a) on the upper surface, and wherein said gripping devices (20;120) comprise at least one pair of sliders (21;121;221) inserted in the base (10;110;210) inside a respective seat (16;116;216) and translationally movable in different directions upon operation of the said actuating devices (30), each jaw being associated with a respective slider (21;121;221); wherein said jaws (22) comprise a toothing (22a) adapted to cooperate with a corresponding rack (21a) of the respective slider (21) for rotational actuation thereof.

2. Device according to claim 1, wherein said jaws (22; 122;222) are arranged above or alongside the respective slider (21;121;221) and have a pin (22b;122b;222b) projecting from one side of the jaw at right angles thereto and parallel to the upper surface of the base (10;110;210) for engagement with a corresponding hole (13;113;213) in a frame (12b) of the base (10) or a distal head (112d;212d) of the said slider.

3. Device according to claim 1, wherein the base (110; 210) has an inclined surface (132a;232a) formed in a lateral cavity (132;232) parallel to each slider receiving seat (116; 216),
    the inclined surface being formed at the end of the cavity (132;232) which is distal relative to a central vertical axis (Z-Z) of the base, and extending between a lower level substantially corresponding to a bottom of the cavity (132;232) and an upper level corresponding to the upper surface (115;215) of the base (110;210).

4. Device according to claim 1, wherein said actuating devices (30) comprise a disk (31) having, formed therein, a number of cams (32) corresponding to the number of sliders (21), inside each cam there being inserted a pin (21b) projecting in the vertical direction from the bottom surface of each slider (21).

5. Device according to claim 1, wherein said actuating devices comprise a toothed wheel (135) rotating about a vertical axis (135a) and designed to mesh with a rack (121a) formed on the inner side of each slider (121).

6. Device according to claim 1, wherein said actuating devices (30) comprise movement receiving devices for coupling with movement generating devices (M) of the electromechanical, pneumatic or similar type.

7. Device according to claim 6, wherein said movement receiving devices comprise pins (35) projecting from the bottom surface of a disk (31) of the actuating devices or pins (213b) projecting from a head (221b) of the slider (221) or a vertical axis (135a) of a toothed wheel (135).

8. Device according to claim 1, wherein said base (10) comprises a cross-shaped frame (12), the arms (12a) of which are U-shaped and define a respective seat of the receiving seats (16),
    in that the branches (12b) of the U have formed therein oppositely arranged holes (13) with an axis parallel to the upper surface (15) for receiving pins (22b) projecting from the jaws (22); and
    wherein in their part adjacent to a bottom surface (11) of the base (10) the branches (12b) of the U have guides (12c) extending parallel to the arms themselves for the sliding of shoes (21c) of elements (21) of the container (1) gripping devices (20).

9. Device according to claim 1, wherein the upper surface (15;115;215) of the base (10;110;210) is provided with openings (15a;115a) for passage of a respective jaw (22; 122;222),
    each opening being aligned with a respective seat (12; 132;232) for containing the jaw (21;121;221).

10. Device according to claim 9, wherein said base (10) comprises a bottom surface (11) which has, formed therein:
    radial slots (11a) arranged at a suitable angular distance from each other and correspondingly aligned with said openings (15a;115a) in the upper surface; and
    a central through-hole (11b).

11. Device for supporting and gripping containers (1,1a), comprising:
    a base (10;110;210) defining an upper surface (15;115; 215) for supporting a container (1,1a);
    devices (20;120) for gripping the container (1,1a), associated with the said base (10;110;210);
    devices (30) for actuating the devices (20;120) for gripping the container (1,1a), wherein said gripping devices (20;120) comprise at least one pair of jaws (22;122; 222), each rotating between a position, pivoted downwards, substantially contained below the upper surface (15;115;215) of the base (10;110;210), and a raised position for gripping the container (1,1a) on the upper surface, and wherein said gripping devices (20;120) comprise at least one pair of sliders (21;121;221) inserted in the base (10;110;210) inside a respective seat (16;116;216) and translationally movable in different directions upon operation of the said actuating devices (30), each jaw being associated with a respective slider (21;121;221); wherein said actuating devices (30) comprise a disk (31) having, formed therein, a number of cams (32) corresponding to the number of sliders (21), inside each cam there being inserted a pin (21b) projecting in the vertical direction from the bottom surface of each slider (21).

12. Device according to claim 11, wherein said jaws (22;122;222) are arranged above or alongside the respective slider (21;121;221) and have a pin (22b;122b;222b) projecting from one side of the jaw at right angles thereto and parallel to the upper surface of the base (10;110;210) for engagement with a corresponding hole (13;113;213) in a frame (12b) of the base (10) or a distal head (112d;212d) of the said slider.

13. Device according to claim 11, wherein said jaws (22) comprise a toothing (22a) adapted to cooperate with a corresponding rack (21a) of the respective slider (21) for rotational actuation thereof.

14. Device according to claim 11, wherein the base (110;210) has an inclined surface (132a;232a) formed in a lateral cavity (132;232) parallel to each slider receiving seat (116;216), the inclined surface being formed at the end of the cavity (132;232) which is distal relative to a central vertical axis (Z-Z) of the base, and extending between a lower level substantially corresponding to a bottom of the cavity (132;232) and an upper level corresponding to the upper surface (115;215) of the base (110;210).

15. Device according to claim 11, wherein said actuating devices (30) comprise movement receiving devices for coupling with movement generating devices (M) of the electromechanical, pneumatic or similar type.

16. Device according to claim 15, wherein said movement receiving devices comprise pins (35) projecting from the bottom surface of the disk (31) of the actuating devices or pins (213b) projecting from a head (221b) of the slider (221) or a vertical axis (135a) of a toothed wheel (135).

17. Device according to claim 11, wherein said base (10) comprises a cross-shaped frame (12), the arms (12a) of which are U-shaped and define a respective seat of the receiving seats (16), in that the branches (12b) of the U have formed therein oppositely arranged holes (13) with an axis parallel to the upper surface (15) for receiving pins (22b) projecting from the jaws (22); and wherein in their part adjacent to a bottom surface (11) of the base (10) the branches (12b) of the U have guides (12c) extending parallel to the arms themselves for the sliding of shoes (21c) of elements (21) of the container (1) gripping devices (20).

18. Device according to claim 11, wherein the upper surface (15;115;215) of the base (10;110;210) is provided with openings (15a;115a) for passage of a respective jaw (22;122;222), each opening being aligned with a respective seat (12;132;232) for containing the jaw (21;121;221).

19. Device according to claim 18, wherein said base (10) comprises a bottom surface (11) which has, formed therein:
- radial slots (11a) arranged at a suitable angular distance from each other and correspondingly aligned with said openings (15a;115a) in the upper surface; and
- a central through-hole (11b).

* * * * *